United States Patent [19]
Kämpf

[11] Patent Number: 5,868,231
[45] Date of Patent: Feb. 9, 1999

[54] TORQUE LIMITING COUPLING

[75] Inventor: Klaus Kämpf, Lohmar, Germany

[73] Assignee: GKN Walterscheid GmbH, Lohmar, Germany

[21] Appl. No.: 823,438

[22] Filed: Mar. 24, 1997

[30] Foreign Application Priority Data

Mar. 25, 1996 [DE] Germany .................. 196 11 622.8

[51] Int. Cl.⁶ ...................................................... F16D 7/08
[52] U.S. Cl. .......................... 192/56.5; 192/56.62; 464/38
[58] Field of Search ............................... 192/56.33, 56.5, 192/56.54, 56.57, 56.62, 56.1, 56.43; 464/38

[56] References Cited

U.S. PATENT DOCUMENTS

| | | | |
|---|---|---|---|
| 3,080,029 | 3/1963 | Stober | 192/56.54 |
| 4,142,616 | 3/1979 | Dekoninck | 192/56.54 |
| 4,294,340 | 10/1981 | Kunze | 192/56.54 |
| 4,538,715 | 9/1985 | Konrad et al. | |
| 5,092,441 | 3/1992 | Fujii | 192/56.54 |

FOREIGN PATENT DOCUMENTS

| | | |
|---|---|---|
| 0 045 027 A1 | 2/1982 | European Pat. Off. . |
| 25 26 212 A1 | 1/1976 | Germany . |
| 31 51 485 C1 | 1/1983 | Germany . |
| 37 27 484 A1 | 2/1988 | Germany . |
| 21 33 093 | 7/1984 | United Kingdom . |

*Primary Examiner*—Charles A. Marmor
*Assistant Examiner*—Saúl J. Rodríguez
*Attorney, Agent, or Firm*—Harness, Dickey & Pierce, P.L.C.

[57] ABSTRACT

A torque limiting coupling, in drive lines or driving agricultural machinery has a first coupling part (1) and a second coupling part (14), as well as a switching ring (19) loaded by a spring (28). Balls (30) transmit torque between the first coupling part (1) and the second coupling part (14). The balls are axially adjustable in apertures (6) of the first coupling part (1). The apertures (6) are uniformly circumferentially distributed around the axis of rotation (2). In the torque transmitting position, the apertures (6) are positioned opposite torque transmitting recesses (16) in the second coupling part (14). The balls (30) are held in recesses (16) in the engaged condition by the switching ring (19). When the torque is exceeded, the balls (30) escape out of the torque transmitting recesses (16). In the course of this process, the switching ring (19) is first displaced against the force of the loading spring (28). To ensure that the coupling is transferred only when the first coupling part (1) is associated in a certain way with the second coupling part (14), a control ball (31) is provided which cooperates with a first control recess (21) of the second coupling part (14).

3 Claims, 3 Drawing Sheets

TORQUE LIMITING COUPLING

BACKGROUND OF THE INVENTION

The invention relates to a torque limiting coupling, especially for drives of or driving agricultural machinery. The coupling includes a first coupling part with apertures which extend parallel to an axis of rotation. The apertures are uniformly distributed on a rolling circle. A second coupling part is rotatable around the axis of rotation relative to the first coupling part. The second coupling part is axially fixed. The second coupling part has torque transmitting recesses at its end face opposed to the first exit end of the apertures. The recesses are arranged to match the arrangement of the apertures. A switching ring is rotatably arranged around the axis of rotation relative to the first coupling part. The second coupling part includes freewheeling recesses in its end face opposed to the second exit end of the apertures. The freewheeling recesses are arranged to match the arrangement of the rolling circle and the distribution of the apertures. However, in the torque transmitting position, the freewheeling apertures are held so as to be displaced in the circumferential direction relative to the apertures. Torque transmitting balls are axially adjustably received in the apertures. The balls engage the torque transmitting recesses in the torque transmitting position and the freewheeling recesses in the freewheeling position. A spring axially acts on the switching ring. The spring supports the switching ring against any adjustment away from the apertures.

DE 31 51 485 C1 describes a torque limiting coupling. To secure the two coupling parts relative to one another in the torque transmitting position, a plurality of securing pins are provided. The pins are arranged on the circumference of the first coupling part and are spring-loaded in the axial direction. The pins engage recesses of the switching ring so that the switching ring cannot change its position relative to the first coupling part. After overloading has occurred, the two coupling parts can reach a torque transmitting position relative to one another which differs from the original one. However, with some applications, such a difference can be disadvantageous. In the case of land machinery where certain parts of the machine performs different functions of the machine, the parts are adjusted to one another in such a way all movements are synchronous.

DT 25 26 212 A1 describes a torque limiting coupling which includes torque transmitting balls arranged in a cage positioned between two planar faces of two coupling parts. One part is the driving part and the other one the driven part. The surfaces of the two coupling parts positioned opposite the cage are provided with circumferentially distributed recesses. The recesses correspond to the balls held in the cage. The recesses are engaged by the balls for torque transmitting purposes if the coupling is in the connected position. A spring loads the axially adjustable coupling part. If the torque limited by the spring is exceeded, the adjustable coupling part is moved against the force of the spring. Thus, the balls are able to leave the recesses and enter other recesses of the driven coupling part. In the case of overloading, the coupling parts are supported by supporting balls which are arranged on a smaller radius than the first balls. In the connected condition, the supporting balls engage recesses in the two coupling parts. The recesses for the supporting balls are distributed in such a way that the supporting balls and the balls simultaneously engage their associated recesses. For re-connecting the coupling, the cage is deliberately rotationally adjusted by a tool. Thus, it is possible to find a position in which the supporting balls and the further balls are able to engage their associated recesses. Since there are three circumferentially distributed supporting balls with the same pitch, the supporting balls and the three balls, provided for torque transmitting purposes, are all able to engage at a rotational angle of 120° of the coupling parts relative to one another.

DE 37 27 484 A1 describes an improved version of the torque limiting coupling proposed in DE 25 26 212 A1. Here, stops are provided which simplify reconnection of the coupling.

GB 21 33 093 A describes a torque limiting coupling where balls are used for torque transmitting purposes. The balls engage opposed recesses in the two coupling parts and leave the recesses against the force of a spring when one coupling part is axially adjusted. Three uniformly circumferentially distributed balls and recesses enable the balls to engage in three different circumferential positions of the two coupling parts relative to one another. The further balls arranged on the smaller rotational diameter remain in constant engagement with the second coupling part and a driving element. However, the balls enable axial adjustment of the two relative to one another. The balls are a substitute for teeth.

SUMMARY OF THE INVENTION

It is an object of the invention to provide a torque limiting coupling which enables reconnection only if the coupling parts are in a certain position relative to one another. A 360° distance has to be covered to re-transfer the coupling parts into the torque transmitting position.

In accordance with the invention, a first coupling part includes an axially extending control aperture. The aperture is arranged relative to the rotational axis on a control circle. The control circle diameter deviates from the rolling circle. A first control recess is provided in the end face of the first coupling part. A second control recess is provided in the end face of the switching ring. The end faces are arranged opposite the exit ends of the control aperture. The second control recess is associated with the switching ring. The second control recess is circumferentially offset in accordance with the freewheeling recesses in the torque transmitting position. The control ball is received in the control aperture to engage either the first or the second control recess. The control ball is adjustable parallel to the axis of rotation.

An advantage of this design is that the coupling is always transferred into the torque transmitting position with the coupling parts in their originally predetermined association. Thus, if the coupling is used in any kind of machinery where the various functional parts have to be operated relative to one another in a certain combination, the correct positional association are always ensured and thus a synchronous function.

According to a further embodiment of the invention, the control circle includes a smaller diameter than the rolling circle. Arrangement on a smaller diameter is possible because the control ball itself does not need to participate in the transmission of torque. This means that the predetermined diameter of the coupling can be fully utilized to arrange the torque transmitting balls. It means that the balls can be arranged on the largest possible diameter and that, while the load remains the same, it is possible to transmit a higher torque than with an embodiment where the balls are arranged on a smaller rolling circle.

To ensure that the control ball itself does not take part in the transmission of torque, the control ball has a smaller diameter than the balls. Otherwise, the torque transmitting recesses, first control recess, the freewheeling recesses, second control recess, apertures and control aperture have the same dimensions.

From the following detailed description, taken in conjunction with the drawings and subjoined claims, other objects and advantages of the present invention will become apparent to those skilled in the art.

BRIEF DESCRIPTION OF THE DRAWINGS

A preferred embodiment of the invention is diagrammatically illustrated in the drawing wherein.

DETAILED DESCRIPTION OF THE DRAWINGS

Figure 1:
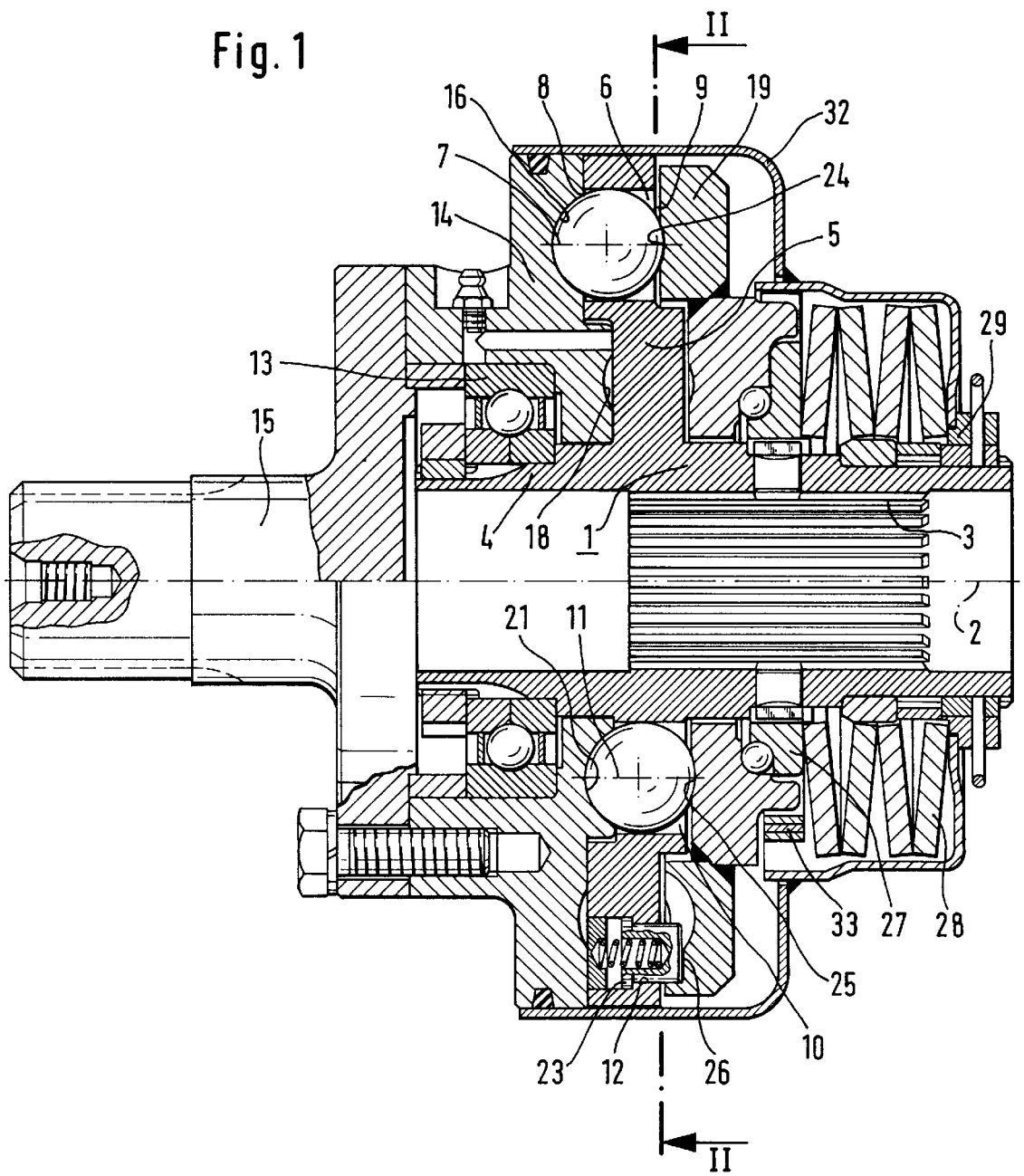
FIG. 1 is a longitudinal section view through a torque limiting coupling in the torque transmitting position.
Figure 2:
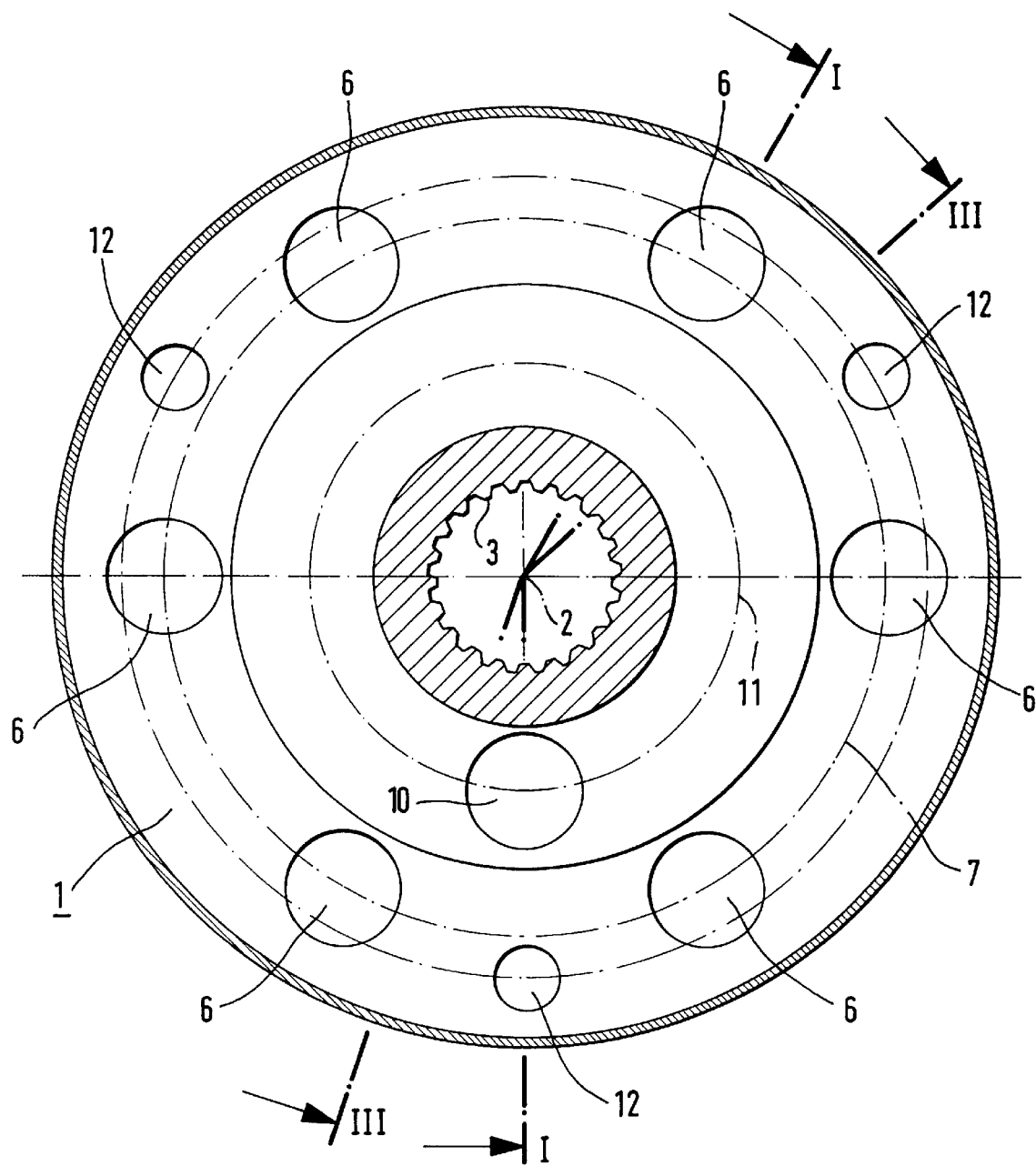
FIG. 2 is a section view of FIG. 1 along line II—II thereof.
Figure 3:
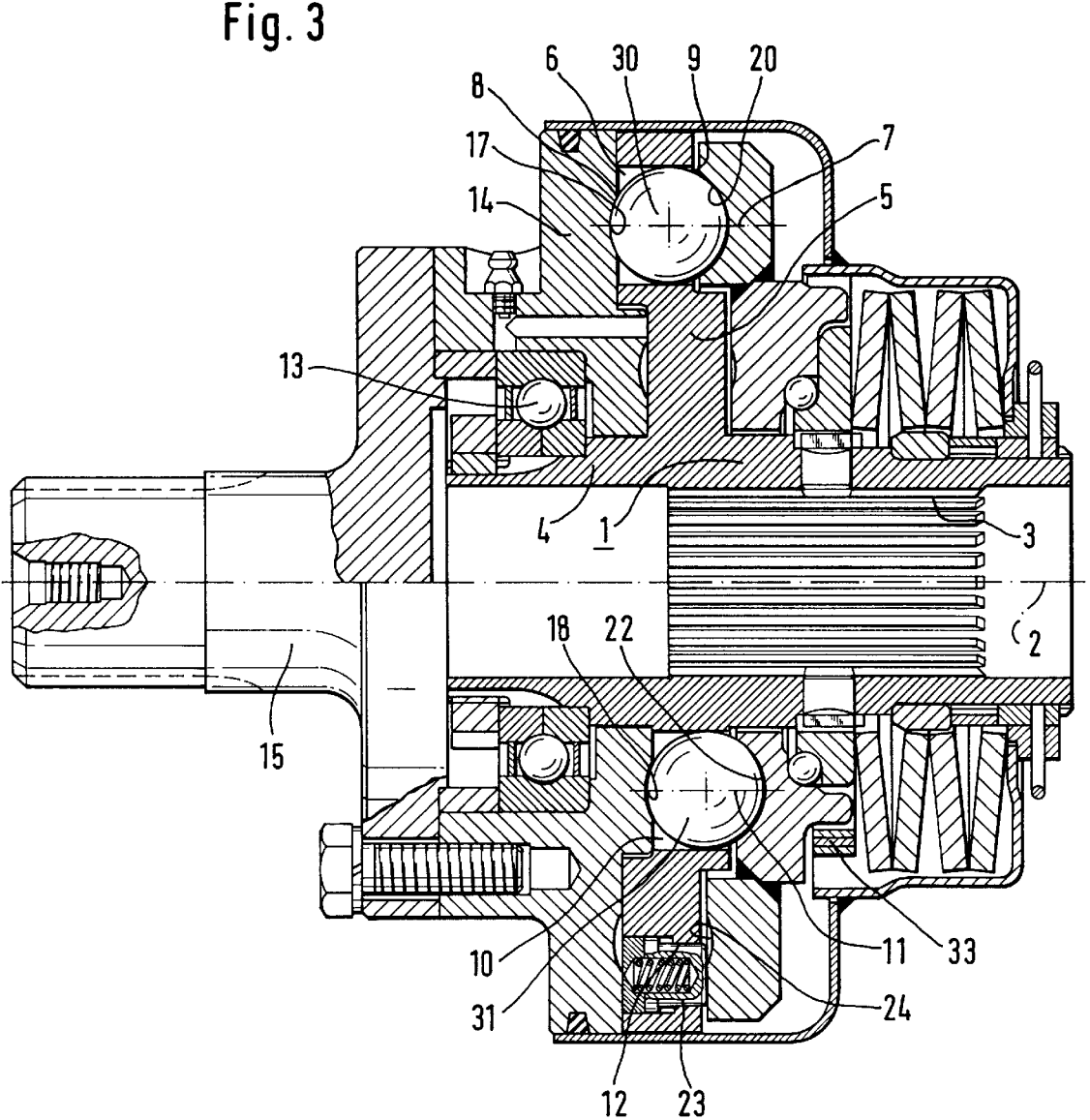
FIG. 3 is a longitudinal section view along sectional line III—III of FIG. 2, with the torque transmitting coupling in a freewheeling position.

First, the design of the inventive torque limiting coupling will be explained with reference to FIGS. 1 to 3, and subsequently the torque transmitting position will be described in greater detail with reference to FIG. 1 and the freewheeling position with reference to FIG. 3.

The first coupling part 1 is rotatable around the axis of rotation 2 and includes a bore 3. The bore 3 has multi-splines which connect to a driving part.

The first coupling part 1 has a tubular hub portion 4. A radially outwardly directed flange portion 5 is in the central region of the hub. Towards the axis of rotation 2, the flange portion 5 has a region of a certain thickness with apertures or cylindrical bores 6 uniformly distributed on the rolling circle 7. The bore axes extend parallel to the axis of rotation 2. The apertures 6 are open towards both end faces of the flange portion 5 of the first coupling part 1. The first exit end of the apertures 6 has been given the reference number 8 and its second exit end the reference number 9.

The first coupling part 1 includes a control aperture 10 arranged on a control circle 11. The control circle diameter is smaller than that of the rolling circle 7. Furthermore, the control aperture 10 is arranged on half the pitch between two apertures 6, as can be seen in FIG. 2. The first coupling part, in the flange portion 5, has three circumferentially distributed receiving bores 12. The bores 12 have a smaller diameter in the region of the second exit end 9 and a larger diameter in the region of the first exit end 8. The receiving bores 12 are also arranged between two circumferentially adjoining apertures 6. A rolling contact bearing 13 is arranged in the region of the hub portion 4 in front of the first exit end 8.

The second coupling part 14, via the rolling contact bearing 13, is rotatably supported on the first coupling part 1. The second coupling part 14 is associated with a connecting journal 15. The connecting journal 15 serves to non-rotatingly connect a driven component. The second coupling part 14 is disc-shaped and, in its end face facing the first exit end 8, includes torque transmitting recesses 16.

The recesses 16 are adapted to the shape of a spherical cap. As can be seen in FIG. 2, there are six apertures 6 in total. Accordingly, the second coupling part 14 also has six torque transmitting recesses 16. The recesses are arranged on the same rolling circle 7 as the apertures 6 and, like the apertures 6, the recesses are uniformly circumferentially distributed around the axis of rotation 2.

First running grooves 17 extend between each two torque transmitting recesses 16. The running grooves 17 are shaped like a circular arch. The second coupling part 14 includes a first control recess 21 shaped like the torque transmitting recesses 16 to correspond with the control aperture 10. Furthermore, a second running groove 18 of the second coupling part constitutes an annulus interrupted only by the first control recess 21. The running groove 18 is centered on the control circle 11.

A switching ring 19 is arranged at the end of the flange portion 5 associated with the exit end 9 of the apertures 6. The switching ring 19 is rotatable relative to the first coupling part 1. The rotatable switching ring 19 is loaded by the leg spring 33. The spring may also be arranged as described in DE 31 51 485 C1. The spring 33 holds the switching ring 19 in a certain rotational position around the axis of rotation 2 relative to the first coupling part 1 or rather its apertures 6. Also, the springs load the switching ring towards the position.

The switching ring 19 includes freewheeling recesses 20 arranged on the rolling circle 7. The recesses 20 are circumferentially distributed in the ring end face and positioned opposite the exit end 9. Since there is a total of six apertures 6, there are six freewheeling recesses 20. A first annular track 24 is between each two freewheeling recesses 20. A second control recess 22 is provided on the second coupling part. The second control recess is arranged on the rolling circle 11 and located in the circumferential direction between two freewheeling recesses 20.

The switching ring 19 includes securing recesses 26 whose arrangement corresponds to that of the receiving bores 12. The switching ring 19 is suitable to engage spring-loaded securing pins 23 arranged in the receiving bores 12. When the securing pins 23 are engaged, they secure the switching ring 19 in its rotational position relative to the first coupling part 1.

The switching ring 19 is supported by rolling contact members on a bearing ring 27. The bearing ring itself rests against a plate spring 28. The plate spring 28 is effective in the direction of the axis of rotation 2. The other end of the plate spring is supported against a supporting element 29. The support element 29 is held on the hub portion 4 of the first coupling part 1.

Torque transmitting balls 30 are received in the apertures 6. The balls are adjustable parallel to the direction of the axis of rotation 2. The control aperture 10 holds a control ball 31. The ball 31 is adjustable in one direction in parallel to the axis of rotation 2. The diameter of the control ball 31 is slightly smaller than that of the torque transmitting balls 30. The control ball 31 does not take part in the transmission of torque. The control ball 31 only serves if corresponding positions are achieved, to enable the balls 30 to engage the torque transmitting recesses 16. A cover 32 covers the components, thus achieving a closed unit. The two coupling parts 1 and 14 are in the predetermined rotational position relative to one another.

Below, the torque transmitting position is described with reference to FIG. 1. The balls 30, in the apertures 6, are displaced towards the left towards the second coupling part 14. The balls 30 engage the torque transmitting recesses 16. The balls, on the other side, are supported against the first track 24 of the switching ring 19. The leg springs 33 act in the circumferential direction around the axis of rotation 2. The freewheeling recesses 20 of the switching ring 19 are held in a circumferentially adjusted position relative to the apertures 6. This also applies to the control ball 31 which engages the first control recess 21 in the second coupling part 14. The ball 31 also projects slightly beyond the end face towards the second exit end 9. The ball 31 rolls on the second track 25 of the switching ring 19. It can also be seen that the securing pin 23 engages the securing recess 26. The first coupling part 1 constitutes the driving component.

If for instance a blockage occurred in the machinery, so that the second coupling part 14 is held back in the direction of rotation relative to the first coupling part 1, the balls 30 and the control ball 31 rise in the torque transmitting recesses 16 and in the first control recess 21, respectively. While rolling at the same time, the switching ring 19 is displaced towards the right towards the supporting element 29 against the force of the spring 28. As can be seen in FIG. 3, the balls 30 reach the first running grooves 17. The control balls 31 reach the second running grooves 18 of the second coupling part 14. As the first coupling part 1 continues to rotate relative to the second coupling part 14, the contact between the switching ring 19 and the balls 30 and the control ball 31, respectively, leads to a circumferential adjustment of the switching ring 19 relative to the first coupling part 1 in the direction of rotation around the axis of rotation 2. The force of the leg spring 33 loads the switching ring until the freewheeling recesses 20, provided in the switching ring 19, and the second control recesses 22 coincide with the apertures 6 and balls 30 on the one hand and with the control aperture 10 and control ball 31 on the other hand. Thus, the balls enter the freewheeling recesses 20.

The switching ring 19 is again returned to the left into the starting position where it is not loaded by the spring 28. The first coupling part 1 then freewheels together with the switching ring 19 and the balls 30 and control ball 31, respectively. The balls 30 and the control ball 31 only slightly engage the associated torque transmitting recesses 16 and the first control recess 21, respectively. Thus, a kind of ratchet effect exists.

When the speed differential decreases towards zero, the possibility of reconnection exists. The control ball 31 ensures that the first coupling part 1 and the second coupling part 14 have to be in one particular rotational position relative to one another to be transferred into the position as illustrated in FIG. 1. Thus, the control ball 31 must be positioned opposite the control recess 21 of the second coupling part 14. Because of the springs loading the switching ring 26, the balls 30 and the control ball 31 are rotated towards the left into engagement with the torque transmitting recesses 16 and the first control recess 21, respectively. Such a movement can be almost force-free because the spring, in this position, does not load the switching ring 19. The switching ring 19 is not loaded and the reaction force is not generated until a torque occurs between the two coupling parts 1 and 14.

While the above detailed description describes the preferred embodiment of the present invention, the invention is susceptible to modification, variation and alteration without deviating from the scope and fair meaning of the subjoined claims.

I claim:

1. A torque limiting coupling, used in drives of or for driving agricultural machinery, comprising:

a first coupling part with apertures which extend parallel to an axis of rotation, said apertures being uniformly distributed on a rolling circle;

a second coupling part rotatably supported on said first coupling part, said second coupling part at its end face opposed to a first exit end of the apertures, including torque transmitting recesses arranged to match said apertures;

a switching ring rotatably arranged around the axis of rotation relative to the first coupling part;

freewheeling recesses are in said switching ring in its end face opposed to a second exit end of the apertures;

the freewheeling recesses are arranged to match the first coupling part aperture distribution on the rolling circle and in a torque transmitting position, the switching ring being held in a desired rotational position around the axis of rotation relative to the first coupling part, such that the freewheeling recesses are held so as to be displaced in the circumferential direction relative to the apertures;

torque transmitting balls are axially adjustably received in the apertures, the torque transmitting balls engage the torque transmitting recesses in the torque transmitting position and the freewheeling recesses in the freewheeling position; and a spring axially acting on the switching ring, said spring supports said ring against any adjustment away from the apertures, said first coupling part including an axially extending control aperture arranged relative to the rotational axis on a control circle whose diameter deviates from that of the rolling circle, a first control recess and second control recess are arranged opposite the exit ends of the control aperture in the end faces of the second coupling part and switching ring, respectively, the second control recess being associated with the switching ring and being circumferentially offset in accordance with the freewheeling recesses in the torque transmitting position; and a control ball received in the control aperture to engage either the first or the second control recess with the control ball being adjustable parallel to the axis of rotation.

2. A torque limiting coupling according to claim 1, wherein the control circle includes a smaller diameter than the rolling circle.

3. A torque limiting coupling according to claim 1, wherein the control ball has a smaller diameter than the torque transmitting balls, the torque transmitting recesses at the second coupling part end face, the first control recess at the second coupling Part end face, the freewheeling recesses at the switching ring end face, as well as the second control recess at the switching ring end face, and the apertures, and the control aperture, having the same diameter.

* * * * *